No. 627,577.  
C. F. DUNDERDALE.  
TELEPHONE.  
(Application filed Dec. 16, 1895.)
(No Model.)
Patented June 27, 1899.
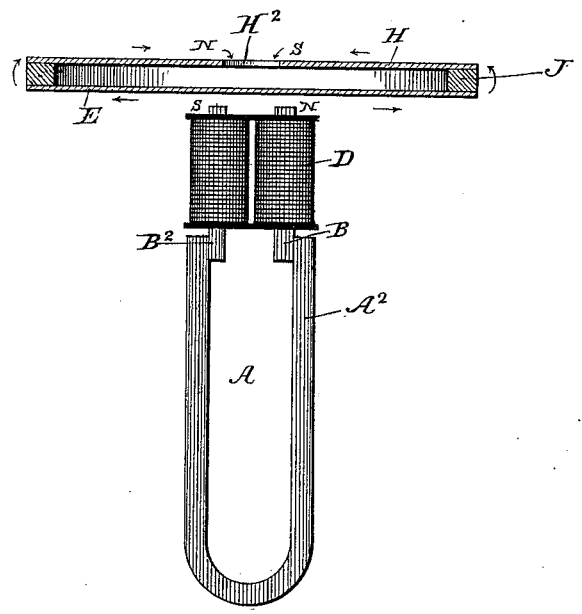
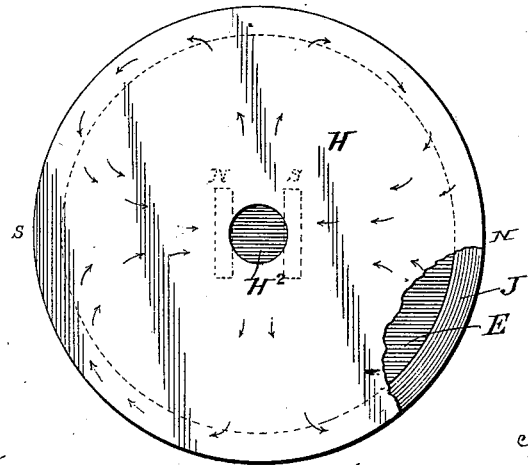

UNITED STATES PATENT OFFICE.

CLEAVELAND F. DUNDERDALE, OF CHICAGO, ILLINOIS.

TELEPHONE.

SPECIFICATION forming part of Letters Patent No. 627,577, dated June 27, 1899.

Application filed December 16, 1895. Serial No. 572,353. (No model.)

*To all whom it may concern:*

Be it known that I, CLEAVELAND F. DUNDERDALE, a citizen of the United States, residing at Chicago, in the county of Cook and State of Illinois, have invented certain new and useful Improvements in Telephones, of which the following is a specification.

The object of my invention is to increase the sensitiveness of the diaphragm of a telephone in its active response to changes in the magnetic inertia of a magnet or magnets juxtapositioned relative to said diaphragm and to accomplish this result by increasing the effect of the magnetization of said diaphragm.

In carrying out my invention I provide what may be termed a "main" diaphragm or diaphragm proper, which is directly acted upon by a suitable magnet or magnets having coils about the ends, which coils are connected with the line and which magnets are positioned opposite to the main diaphragm. Preferably in parallelism with and in close proximity to the main diaphragm or diaphragm proper is a secondary diaphragm or supplemental plate which is centrally perforated and is isolated from the main diaphragm.

It is known that the magnetism induced into the diaphragm proper polarizes about the periphery thereof, and with this, my form of construction and arrangement, the magnetic lines of force emanating from the magnet or magnets are concentrated, collected, and centralized over the ends of the magnet or magnets, thereby magnetizing the diaphragm to an increased extent and rendering the same more sensitive. By reason of this construction I also provide a resonator-chamber between the diaphragm proper and the secondary diaphragm, thereby increasing the sound of vibration of diaphragm proper and the efficiency of the instrument.

Reference may now be had to the following detailed description and to my claim for further features of invention and to the accompanying drawings, in which—

Figure 1 is an elevation of my improved receiver without any inclosing case, the diaphragm proper and secondary diaphragm or plate being shown in section and the arrows indicating the magnetic circuits. Fig. 2 is a plan view of the same, the dotted lines indicating the ends of the magnet.

The horseshoe-magnet is designated at A, consisting of the permanent magnet $A^2$ and the usual soft-iron polar extensions B and $B^2$, with the coils D wound thereon, connected with the line in the ordinary manner. Opposite the ends of the polar extensions B, or opposite the ends of the magnet A, is a diaphragm proper, which may be termed the "main" diaphragm E, and in proximity thereto is a secondary diaphragm or plate H, separated from the main diaphragm E by the insulating-ring J, the secondary diaphragm H being centrally perforated at $H^2$.

By following the direction of the arrows the course of the magnetic circuits may be observed. The lines of force emanating from the ends of the magnet A pass from one end of the magnet directly to the other end, thus establishing one magnetic circuit, the other circuit being respectively from each end of the magnet toward the periphery of the main diaphragm. The polarity of the extension B being north that portion of the periphery of the main diaphragm polarized thereby will consequently be of reversed polarity—viz., south—while that portion of the periphery of the main diaphragm polarized by the south pole of the extension $B^2$ will be of increased polarity—viz., north. By reason of the proximity of the secondary diaphragm or plate H, which, however, is separated from the main diaphragm, it is manifest that the peripheral magnetism of the main diaphragm is induced into the periphery of the secondary diaphragm, the polarity thereof being respectively the reverse of the polarity of the periphery of the main diaphragm. Further, owing to the central perforation $H^2$ of the secondary diaphragm positioned directly over the ends of the magnet A the induced peripheral magnetism of the secondary diaphragm H is concentrated, centralized, and collected over the said ends of the magnet, being of a polarity opposite to the peripheral polarity of the main diaphragm E, and also of a reverse polarity to that of the ends of the magnet, the magnetism passing through the center of the main diaphragm to the said ends, and thus completing the magnetic circuit.

From the foregoing it will be manifest that a double magnetic flow of the lines of force is established from the north end of the magnet to the south end thereof through the main diaphragm to the secondary diaphragm through the center of the main diaphragm, by this means concentrating, collecting, and centralizing the magnetism at the center of the main diaphragm and over the ends of the magnet A, rendering said main diaphragm capable of an increased sensitiveness of response to the influence of the magnet A.

The space between the two diaphragms acting as a resonator increases the sound of the vibration of the main diaphragm and increases the efficiency of the receiver. The vibrations within the confined air-space between the two diaphragms act on a secondary diaphragm, causing it to vibrate in synchronism with the diaphragm proper, thus producing a double vibration and consequent increase in the volume of sound emitted.

I claim—

In a telephone a primary imperforate diaphragm, a secondary centrally-perforated diaphragm held in parallelism with but spaced from the primary diaphragm and a permanent magnet with helices thereon the ends of which are in proximity to the primary diaphragm but opposite to the perforation of the secondary diaphragm, the ends of said magnet being of opposite polarity.

In testimony whereof I affix my signature in presence of two witnesses.

CLEAVELAND F. DUNDERDALE.

Witnesses:
   CHAS. C. BULKLEY,
   C. W. GRAHAM.